Feb. 5, 1929.

S. G. ALEX 1,700,783

OIL PRESSURE CONTROL IGNITION SWITCH FOR EXPLOSIVE ENGINES

Filed Dec. 16, 1927

Inventor

Sam G. Alex

By Clarence A. O'Brien
Attorney

Patented Feb. 5, 1929.

1,700,783

UNITED STATES PATENT OFFICE.

SAM G. ALEX, OF CHICO, CALIFORNIA.

OIL-PRESSURE-CONTROL IGNITION SWITCH FOR EXPLOSIVE ENGINES.

Application filed December 16, 1927. Serial No. 240,594.

The present invention relates to ignition switches for explosive engines, being adapted particularly for use in connection with motor vehicles and has for an object to connect the switch for actuation by the oil pressure gauge of the engine, said switch being normally disposed in circuit opening position and adapted to be moved so as to close the circuit upon the creation of a predetermined pressure upon the oil gauge.

A further object is to provide a device of this character which will automatically open the ignition circuit and retain the same in such position until the oil pressure gauge registers a certain predetermined pressure, thereby preventing the operation of the engine in the absence of a suitable amount of oil for the same.

Another object is to provide means for operatively connecting the switch with the oil gauge usually forming a part of the engine, without necessitating any material changes or alterations in the construction thereof, and which embodies a simple, compact and practical construction, which is efficient and reliable in performance, inexpensive to manufacture and otherwise well adapted for the purposes for which the same is intended.

Figure 1:
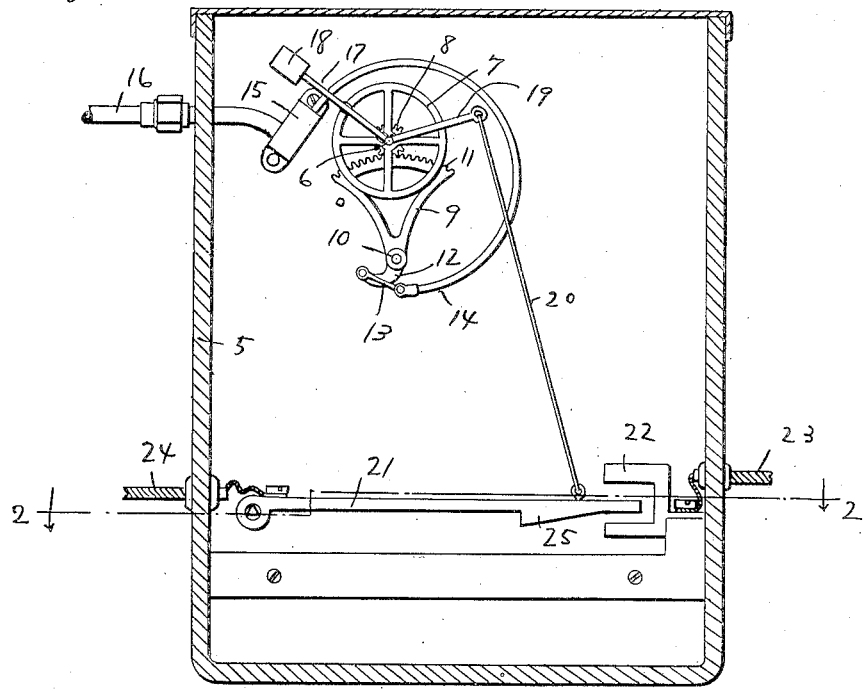
Figure 2:
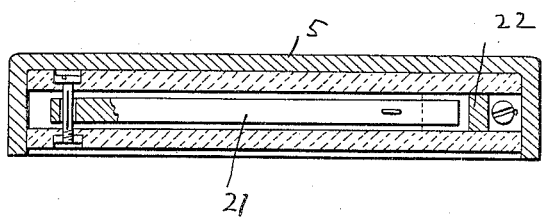

Other objects and advantages reside in the special construction and combination of the various elements comprising the invention, reference being had to the accompanying drawings forming a part hereof, wherein:

Figure 1 is a vertical sectional view through the combined oil pressure gauge and switch housing showing the parts in cooperative position, and Figure 2 is a sectional view therethrough taken substantially along a line 2—2 of Figure 1.

Referring now to the drawings in detail, the invention comprises an oil breaker gauge housing indicated at 5 within the upper portion of which is arranged a transversely disposed dial shaft 6 having a wheel 7 and spur gear 8 mounted for rotation thereon. Adjacent the spur gear 8 is arranged a gear segment 9 fulcrumed upon a pin 10 formed in one face of the housing, said segment being provided with gear teeth 11 engaged with the gear 8. An extension 12 is formed at the lower end of the segment with which a link 13 is attached forming a connection with the end of the pressure gauge tube 14. The pressure gauge tube 14 is of a construction generally used for devices of this character having its end adjacent the link 13 closed and arranged in a curved formation with its opposite end communicating with the coupler 15 mounted within the housing and with which an oil feed pipe 16 is connected for the purpose of supplying oil under pressure from the engine to the pressure gauge tube 14. The tube 14 is sufficiently flexible to enable the end adjacent the link 13 to respond to the pressure of the oil in a manner tending to cause the tube to straighten and through such action it will be apparent that the gear segment 9 will be operated so as to cause the rotation of the wheel 7 and gear 8. The specific construction heretofore described forms no part of my invention as the same is generally used in the construction of oil pressure gauges and is merely utilized as a means for the operation of my invention, which consists of the construction, combination and arrangement of the various details hereinafter explained.

On one side of the wheel 7 is arranged a radially extending arm 17 having a weight 18 attached to its outer end and from the opposite side of the wheel 7 extends a similar arm 19 to the outer end of which is attached a cable 20. Both the arms 17 and 19 extend in an upwardly inclined direction from opposite sides of the wheel 7.

Within the lower portion of the housing is arranged a switch arm 21 pivotally mounted at one end and having its opposite end freely disposed and connected with the lower end of the cable 20. The free end of the arm 21 is inserted in overlapping relation between the arm of a U-shaped contact member 22, said bracket forming a connection with the wire 23 of the ignition circuit of the machine extending from one side of the housing, the pivoted end of the arm 21 also being connected with the circuit by means of the wires indicated at 24 extending from the opposite side of the housing.

The free end of the switch arm 21 is weighted as indicated at 25 to counter-balance the weight 18 carried by the wheel 7 so as to normally maintain the end of the arm in spaced relation with respect to the arm of the bracket 22. It will thus be apparent that the switch arm 21 controls an ignition circuit through its connection with the wires 23 and 24 and accordingly the circuit will be maintained in open position while the engine is not running and will remain in such position until a sufficient pressure is exerted upon the oil pressure gauge to cause the operation of the gear segment 9 and the wheel 7. Thus the operation of the switch arm 21 is at all times dependent upon a sufficient supply of lubricating oil in the engine to cause the actuation of the pressure gauge.

While the switch arm 21 will be normally maintained in a position to prevent the closing of the circuit until the engine is started, it will be understood that in oil pressure gauges of this character that the same are not dependent upon the explosion of the engine to register an oil pressure as the turning over of the motor by the starter is sufficient to create a suitable pressure upon the gauge to cause the actuation thereof and thus close the ignition circuit.

However should the oil in the engine be so low as to fail to create the necessary pressure upon the gauge the switch arm 21 will not be affected and accordingly the engine will not start. Likewise during the running of the engine should the oil become so low as to fail to maintain a predetermined pressure upon the gauge, the gauge consequently will fail to maintain the free end of the switch arm in contacting position whereupon the circuit will be open thus causing the engine to stop.

It is obvious that the invention is susceptible of various changes and modifications, without departing from the spirit or scope of the invention or sacrificing any of its advantages, and I accordingly claim all such forms of the device to which I am entitled.

Having thus described my invention, what I claim as new is:

1. In combination, an oil pressure gauge having a wheel mounted on its dial shaft with radially extending arms extending upwardly at opposite sides thereof, a weight carried on one of said arms, a cable attached to the other of said arms and an ignition switch connected with said cable and operated thereby for movement into circuit closing position upon the creation of a predetermined pressure upon the gauge.

2. In combination, an oil pressure gauge housing having an oil pressure gauge arranged therein, said gauge having a wheel rotatably mounted on its dial shaft, a pair of arms extending radially from the wheel at upwardly inclined angles at opposite sides thereof, a weight carried by one of said arms, a cable connected to the other of said arms, an ignition switch arranged within the housing, comprising a switch arm pivotally mounted at one end, a U-shaped contact bracket arranged adjacent the free end of the switch arm with the end of said switch arm extending between the arms of said bracket and connected to the opposite end of said cable, said free end of the switch arm being weighted to counter-balance the weight carried by the wheel whereby to maintain the switch arm in spaced relation with said contact bracket, said switch arm being responsive to the actuation of the gauge upon the creation of a predetermined pressure thereupon.

In testimony whereof I affix my signature.

SAM G. ALEX.